United States Patent
Lang et al.

(10) Patent No.: US 11,667,244 B2
(45) Date of Patent: Jun. 6, 2023

(54) MOVABLE CLOTHES HANGER ASSEMBLY

(71) Applicant: Brose Fahrzeugteile SE & Co. Kommanditgesellschaft, Coburg, Coburg (DE)

(72) Inventors: Fabian Lang, Ergersheim (DE); Michael Höppel, Bad Staffelstein (DE)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 187 days.

(21) Appl. No.: 16/763,728

(22) PCT Filed: Nov. 12, 2018

(86) PCT No.: PCT/EP2018/080853
§ 371 (c)(1),
(2) Date: May 13, 2020

(87) PCT Pub. No.: WO2019/092226
PCT Pub. Date: May 16, 2019

(65) Prior Publication Data
US 2020/0361392 A1    Nov. 19, 2020

(30) Foreign Application Priority Data
Nov. 13, 2017 (DE) .................. 10 2017 220 174.6

(51) Int. Cl.
*B60R 7/10* (2006.01)
*A47G 25/40* (2006.01)

(52) U.S. Cl.
CPC .............. *B60R 7/10* (2013.01); *A47G 25/40* (2013.01)

(58) Field of Classification Search
CPC ..... B60R 7/10; B60R 7/043; B60N 2002/905; A47G 25/4023; Y10S 224/927
See application file for complete search history.

(56) References Cited

U.S. PATENT DOCUMENTS

| 2,290,722 A | * | 7/1942 | Weingarten | A47G 25/4023 223/94 |
| 2,436,314 A | * | 2/1948 | Lesavoy | A47G 25/447 223/89 |
| 2,736,474 A | * | 2/1956 | Janik | A47G 25/4076 223/90 |
| 4,231,499 A | * | 11/1980 | Smith | A47G 25/4023 223/94 |

(Continued)

FOREIGN PATENT DOCUMENTS

| DE | 924775 C | 3/1955 |
| DE | 2832768 A1 | 2/1979 |

(Continued)

*Primary Examiner* — Brian D Nash
(74) *Attorney, Agent, or Firm* — Dickinson Wright PLLC (57) ABSTRACT

A clothes hanger assembly for installation in a vehicle interior space. The clothes hanger assembly comprises two arms and is adjustable between a stowage position, in which the arms are stowed, and a functional position, in which the arms form a hanger-like construction. The clothes hanger assembly furthermore comprises a carriage and a cable drive. The arms are articulated to the carriage, and the carriage is arranged on the cable drive, wherein the carriage is shiftable by means of the cable drive in order to adjust the clothes hanger assembly between the stowage position and the functional position.

20 Claims, 6 Drawing Sheets

(56) References Cited

U.S. PATENT DOCUMENTS

| | | | | |
|---|---|---|---|---|
| 4,523,701 A * | 6/1985 | Armbruster | A47G 25/403 223/94 |
| 4,645,106 A * | 2/1987 | Pawl | B60R 7/10 224/927 |
| 4,711,488 A * | 12/1987 | Ohanessian | A47C 7/64 297/188.03 |
| 4,717,053 A * | 1/1988 | Wang | A47G 25/4053 223/94 |
| 4,936,491 A * | 6/1990 | Calad | B60R 7/10 224/927 |
| 5,102,019 A * | 4/1992 | Lam | A47G 25/443 223/89 |
| 5,226,569 A * | 7/1993 | Watjer | B60R 7/10 224/927 |
| 5,328,068 A * | 7/1994 | Shannon | B60R 7/10 224/927 |
| 5,397,037 A * | 3/1995 | Ozawa | A47G 25/4023 223/89 |
| 5,419,067 A * | 5/1995 | Drummond | B60R 7/10 224/555 |
| 5,480,076 A * | 1/1996 | Siegel | A47G 25/4038 403/111 |
| 5,820,205 A * | 10/1998 | Ammons | B60R 7/10 224/927 |
| 5,826,759 A * | 10/1998 | Ohsugi | A47G 25/443 223/89 |
| 5,979,721 A * | 11/1999 | Curtis | A47G 25/4023 223/89 |
| 7,395,997 B2 * | 7/2008 | Padden | B60N 2/879 294/142 |
| 7,455,202 B2 * | 11/2008 | Shimura | A47G 25/4076 223/89 |
| D599,272 S * | 9/2009 | Feder | D8/349 |
| 7,694,859 B1 * | 4/2010 | Whittaker | A47G 25/442 223/94 |
| 7,784,864 B2 * | 8/2010 | Feder | B60R 7/043 297/188.2 |
| 8,177,106 B2 * | 5/2012 | Betts | A47G 25/4023 223/94 |
| 8,814,013 B2 * | 8/2014 | Almeida Levi | A47G 25/4023 223/94 |
| 9,387,810 B1 * | 7/2016 | Bishop | A47G 25/08 |
| 10,383,469 B2 * | 8/2019 | Iliev | A47G 25/4023 |
| 2006/0243764 A1 * | 11/2006 | Chiang | B60R 7/10 223/85 |
| 2008/0061203 A1 * | 3/2008 | Riker | B60R 7/10 248/251 |
| 2012/0091177 A1 * | 4/2012 | Ackeret | B60R 7/043 224/275 |
| 2018/0009388 A1 * | 1/2018 | Stakoe | B60R 7/10 |
| 2019/0001854 A1 * | 1/2019 | Gunn | B60N 2/90 |

FOREIGN PATENT DOCUMENTS

| | | |
|---|---|---|
| DE | 3801625 A1 | 8/1989 |
| DE | 4437266 A1 | 5/1995 |
| DE | 19900567 A1 | 7/2000 |
| DE | 10261896 A1 | 7/2004 |
| DE | 102005050404 A1 | 5/2007 |
| DE | 102006012570 A1 | 9/2007 |
| DE | 102007045171 A1 | 4/2009 |
| DE | 102006062966 A1 | 8/2013 |
| DE | 202007019555 U1 | 8/2013 |
| EP | 0753427 A2 | 1/1997 |
| EP | 1817989 A1 | 8/2007 |
| GB | 2547477 A | 8/2017 |
| WO | 9703864 A1 | 2/1997 |

* cited by examiner

MOVABLE CLOTHES HANGER ASSEMBLY

CROSS-REFERENCE TO RELATED APPLICATIONS

This application is the U.S. National Phase of PCT Application No. PCT/EP2018/080853 filed on Nov. 12, 2018, which claims priority to German Patent Application No. DE 10 2017 220 174.6, filed on Nov. 13, 2017, the disclosures of which are hereby incorporated in their entirety by reference herein.

TECHNICAL FIELD

This present disclosure relates to a clothes hanger assembly.

BACKGROUND

The storage of clothing articles in vehicles, which articles are not worn by the driver or passengers while driving, frequently is effected by a storage surface such as an empty seat or on a suspension device such as a hook or a clothes hanger. When stored on a storage surface, there is a risk of soiling of the clothing articles and the limitation of the driving safety on winding roads due to clothing articles flying around. The use of a hook requires the presence of a suspension strap in the neck region of the clothing article and is actually not desired for example for coats because of the formation of folds. To avoid wrinkling a hanger can be used, which however neither can securely be fastened in a vehicle nor can be stored in a space-saving way when not in use.

SUMMARY

One or more objects of the present disclosure may be to provide a clothes hanger assembly which in a functional position may provide a clothes hanger and in the case of non-use may be stowed in a stowage position, so that the stowage position may be space-saving and visually inconspicuous.

According to one embodiment a clothes hanger assembly is provided. The clothes hanger assembly may include two arms and is adjustable between the stowage position, in which the arms are stowed, and the functional position, in which the arms form a hanger-like construction. For adjustment, the clothes hanger assembly may include a carriage and a cable drive, wherein the carriage is arranged on the cable drive and is shiftable by means of the cable drive. The arms are articulated to the carriage. By shifting the carriage, the clothes hanger assembly is adjustable between the stowage position and the functional position.

In other words, the present disclosure proceeds from the idea to achieve the adjustment of the clothes hanger assembly between the stowage position and the functional position by the action of the cable drive. This has the advantage that the adjustment of the clothes hanger assembly may be effected automatically. A manual operation, however, is also conceivable.

In one exemplary embodiment, the arms are foldably mounted on the carriage. In the functional position, the arms in this exemplary embodiment are folded out, and in the stowage position they are folded in. To adjust the clothes hanger assembly, the displacement of the carriage in this exemplary embodiment effects that the arms fold in or out.

The fold-out of the arms may be effected for example away from an axis along a displacement direction of the carriage. Folding in may be effected for example towards an axis along the displacement direction of the carriage. When the arms are folded out, the displacement direction of the carriage may be opposite to the displacement direction of the carriage when the arms are folded in. When folding out, an angle between the arms may be increased in the direction of the displacement direction of the carriage. When folding in, an angle between the arms may be reduced opposite to the displacement direction of the carriage.

In one exemplary embodiment, the clothes hanger assembly may include a guide body. The guide body may serve to guide the carriage. For example, the guide body may comprise at least one guiding groove into which the carriage engages with at least one engagement element. The guide body for example may be of cuboid shape, and the at least one guiding groove then may extend along one of the longest sides of the cuboid guide body.

In one exemplary embodiment, the arms are stowed in the stowage position in a first cavity of the guide body. On transition of the clothes hanger assembly into the functional position, the arms in this exemplary embodiment fold out of the first cavity into the functional position. On transition of the clothes hanger assembly from the functional position into the stowage position in this exemplary embodiment, the arms fold into the first cavity. The carriage may be arranged in the first cavity, and the at least one guiding groove may extend along the first cavity.

On the guide body a first end position of the carriage may be defined for example by a first stop element against which the carriage abuts by being shifted. For example, in the functional position of the clothes hanger assembly the carriage may be arranged in the first end position. For example, the first stop element may be formed such that the carriage and sectionally the arms rest against the first stop element. For this purpose, the carriage may be urged against the first stop element by means of the cable drive. This is may be advantageous for a stable support of the arms in the functional position.

The guide body likewise may include a second stop element, which may define a second end position in which the carriage may be arranged in the stowage position of the clothes hanger assembly. The first stop element and the second stop element may border the first cavity of the guide body.

In one exemplary embodiment, the clothes hanger assembly may include a housing to which the functional body is articulated at least one articulation point. The at least one articulation point may be formed for example by a hinge, and the guide body may be adjustable relative to the housing about the at least one articulation point.

In the functional position, the housing in one exemplary embodiment largely extends along a direction X, the guide body largely extends along a direction Z, and the arms largely extend along a direction Y, wherein the directions X, Y and Z are arranged at right angles to each other.

The housing for example may define a second cavity. In the stowage position, the guide body is stowed in the second cavity. The housing may be formed cuboid for example, and the guide body may be articulated to one of the longest sides of the housing. In this embodiment, the second cavity extends along one of the longest sides of the housing.

In another exemplary embodiment, a swivel element is arranged on the guide body at a distance to the at least one articulation point, so that by means of the cable drive the guide body is adjustable relative to the housing via the swivel element about the at least one articulation point. The swivel element for example may be formed by the edge of a passage in the guide body or a round material. The cable drive may exert a force on the guide body via the swivel element, which force effects pivoting of the guide body about the at least one articulation point.

It is conceivable, for example to adjust the clothes hanger assembly by the cable drive pulling the swivel element in a first direction from the functional position into the stowage position or to adjust the clothes hanger assembly by the cable drive pulling the swivel element in a second direction from the stowage position into the functional position.

In an exemplary embodiment, the cable drive may include a cable, and the carriage is fastened to the cable at a fastening point. The fastening point for example may be a knot or a clip or another fastening means. In an advantageous embodiment, the fastening point is arranged in the center of the carriage in order to prevent canting of the carriage in the guide body.

In one embodiment, the clothes hanger assembly may define a deflection point at which the cable is deflected, for example by 180°. The deflection point may be arranged on the guide housing. As an example, the deflection point may be arranged on the first stop element of the guide body. The deflection point for example may be formed by a round material.

In one embodiment of the clothes hanger assembly, which may include the swivel element and the deflection point, the cable may extend for example from the swivel element through the carriage, and may be fastened at the fastening point; from the carriage, it may extend further to the deflection point of the guide housing, and from the deflection point the cable may extend through the carriage and back to the swivel element.

In one exemplary embodiment, the cable is tensioned by a tensioning device of the clothes hanger assembly. For example, the tensioning device may be arranged in the housing to which the guide body is articulated, and the cable may extend in a first direction from the swivel element to the tensioning device.

In one exemplary embodiment, the cable drive may include a deflection element at which the cable is deflected. The deflection element may be arranged for example on the housing and be formed by a round material. In this exemplary embodiment, the cable extends in a second direction, which is different from the above-mentioned first direction from the swivel element to the tensioning device, from the swivel element to the deflection element.

In another exemplary embodiment, the cable may be wound onto a least one winding element of the cable drive. The at least one winding element may be arranged for example on the housing.

In one embodiment, both ends of the cable may be wound onto a common winding element. For example, a portion of an end of the cable may be wound up in a first direction of rotation, and a portion of the other end of the cable may be wound up in a second, opposite direction of rotation. Winding up of the one end of the cable then for example corresponds to unwinding of the other end of the cable.

From the one wound-up portion the cable for example may be guided such that it extends in a first direction from the winding element to the swivel element, and from the other wound-up portion the cable may be guided such that it extends in a second direction from the winding element to the swivel element.

In principle, it is conceivable that the winding element is manually rotatable, for example by means of an adjusting wheel of the cable drive. It is likewise conceivable that the winding element is non-rotatably mounted on a shaft of the cable drive, which may be driven by means of a motor of the cable drive. In such an embodiment, the clothes hanger assembly is automatically adjustable between the stowage position and the functional position, i.e. in response to an actuation signal.

The clothes hanger assembly may include at least one spring element which pretensions the arms and the carriage against each other. For example, the at least one spring element may be formed by at least one leg spring which is arranged between the carriage and one of the arms. A spring force of the at least one spring element may be directed such that it pretensions the arms into a position in which the arms in the functional position rest against the guide body by forming a hanger-like construction.

In an exemplary embodiment, the clothes hanger assembly may include a stowage element which in the stowage position stows the arms against the spring force of the at least one spring element. For example, the stowage element may be formed by a portion of the guide body. This portion of the guide body for example may enclose a portion of the arms in the stowage position.

In another exemplary embodiment, the clothes hanger assembly may include a first adjustment element and a second adjustment element, against which the arms abut upon adjustment of the clothes hanger assembly from the functional position into the stowage position. In this exemplary embodiment, the first adjustment element and the second adjustment element adjust the arms against the spring force of the at least one spring element. The first adjustment element and the second adjustment element may be formed by a portion of the guide body. For example, the first adjustment element and the second adjustment element may be formed by an edge at the stowage element of the guide body.

In an exemplary embodiment, in which the clothes hanger assembly may include the housing, the guide body articulated thereto and the motor-driven cable drive, the clothes hanger assembly may be configured for installation as a prefabricated module. As an example, the clothes hanger assembly may be configured as a module which is provided for installation into a vehicle interior space. As an example, the clothes hanger assembly may be configured as a module for installation into a vehicle headliner.

Proceeding from the stowage position of the clothes hanger assembly, the automatic adjustment of the clothes hanger assembly in this exemplary embodiment starts with folding out the guide body from the second cavity of the housing, caused by the cable drive pulling the swivel element in a fold-out direction. The further pulling of the cable drive effects a displacement of the carriage in the direction of the first stop element of the guide body so that the arms, which sectionally are enclosed by the stowage element, are shifted out of the stowage element and are folded out by the spring force of the spring element. Further pulling of the cable drive effects a displacement of the carriage, until the clothes hanger assembly reaches the functional position.

On transition from the functional position into the stowage position the automatic adjustment of the clothes hanger assembly in this exemplary embodiment starts with the displacement of the carriage. On abutment of the arms against the first adjustment element and the second adjustment element, the arms fold into the first cavity of the guide body and at the same time the guide body folds into the second cavity of the housing, caused by the cable drive pulling the swivel element in a fold-in direction.

BRIEF DESCRIPTION OF THE DRAWINGS

The idea underlying the invention will be explained in detail below with reference to the exemplary embodiments illustrated in the Figures, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known clothes hanger assembly is provided in DE 102 61 896 A1, which is mounted to the backrest of a vehicle seat, is more space-saving than a clothes hanger, but is optically present and requires much space also in the stowage position.

Another known clothes hanger assembly is provided in EP 0 753 427 A2, which as part of a grab handle is mounted above a vehicle door, is almost invisible in the stowage position, but the attachment in the necessary combination with a grab handle is not very flexible.

For switching from the stowage position into the functional position, both solutions require cumbersome manipulations by hand, such as for example pushing or pulling.

Figure 1:
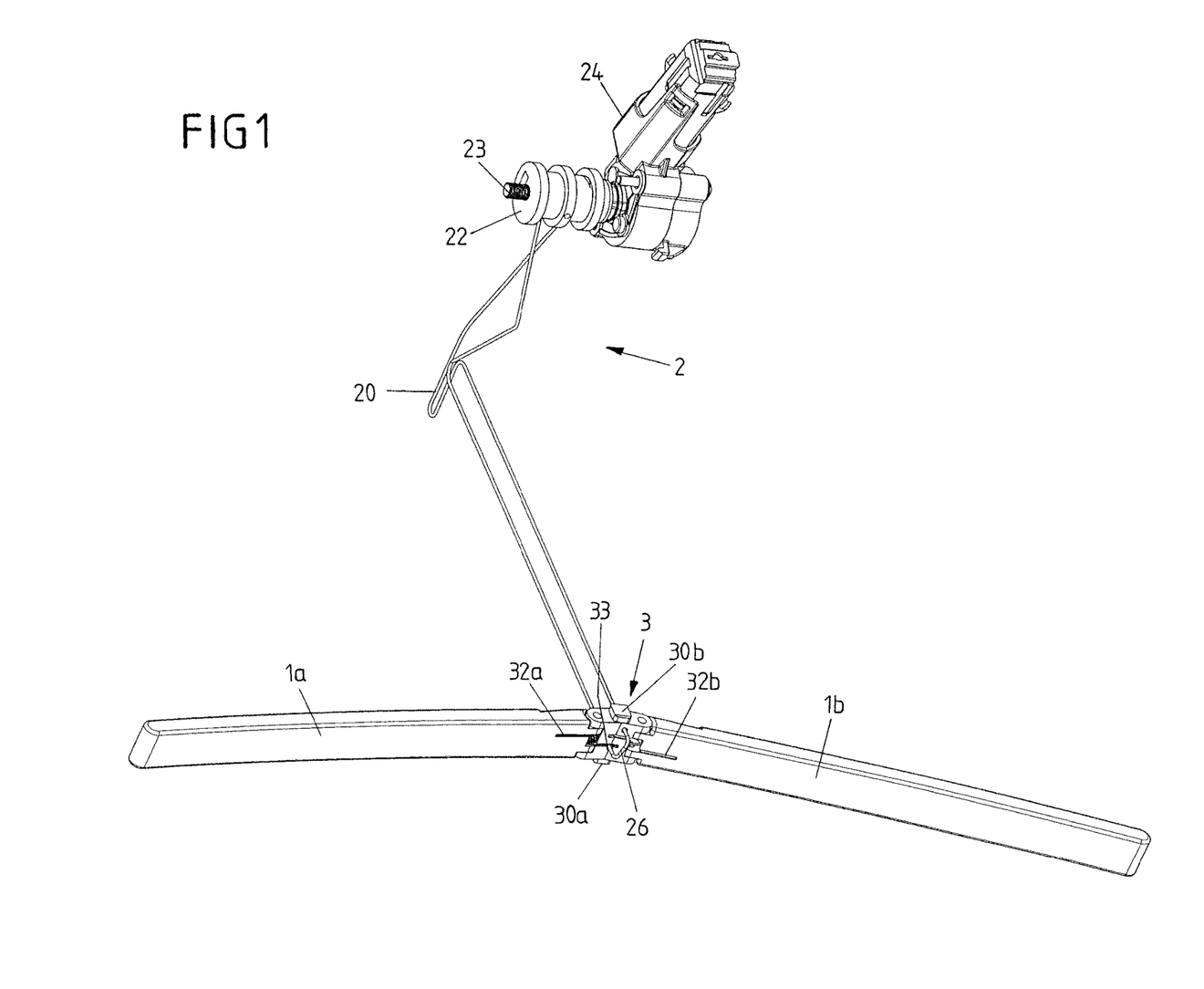
FIG. 1 shows a view of a clothes hanger assembly comprising two arms, a cable drive and a carriage.

FIG. 1 shows a clothes hanger assembly with two arms 1a, 1b, a cable drive 2 and a carriage 3 to which the arms 1a, 1b are articulated. The articulation of the arms 1a, 1b is effected by means of a hinge which foldably mounts the arms 1a, 1b on the carriage 3. The cable drive 2 engages a fastening point 33 at the carriage 3 so that the carriage is shiftable by means of the cable drive 2.

The arms 1a, 1b and the carriage 3 are pretensioned against each other by one leg spring 32a, 32b each.

Figure 2A:
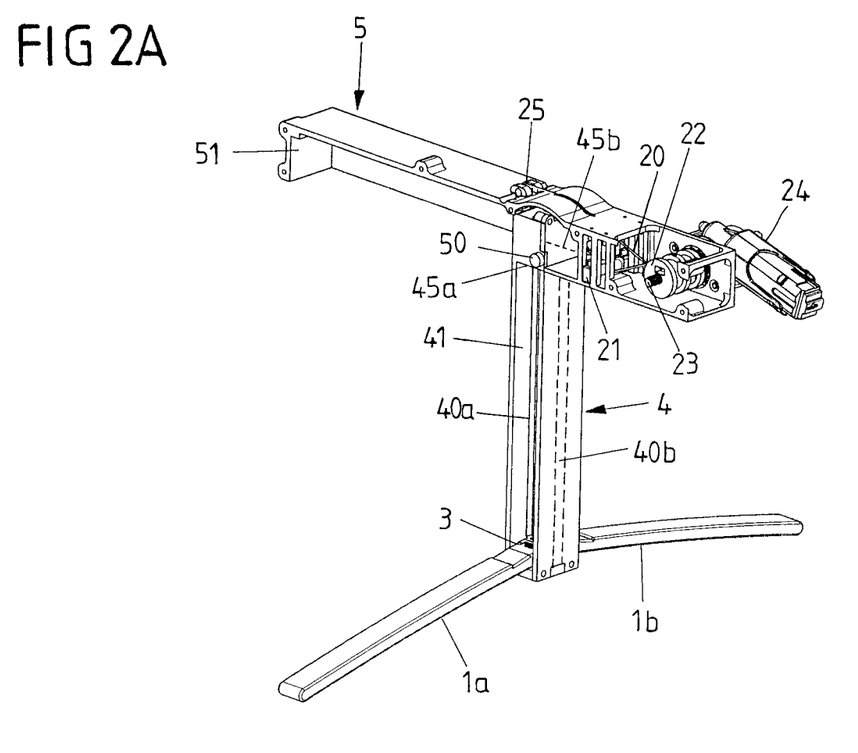
FIGS. 2A, 2B show views of a clothes hanger assembly in a functional position and in a stowage position.
Figure 2B:
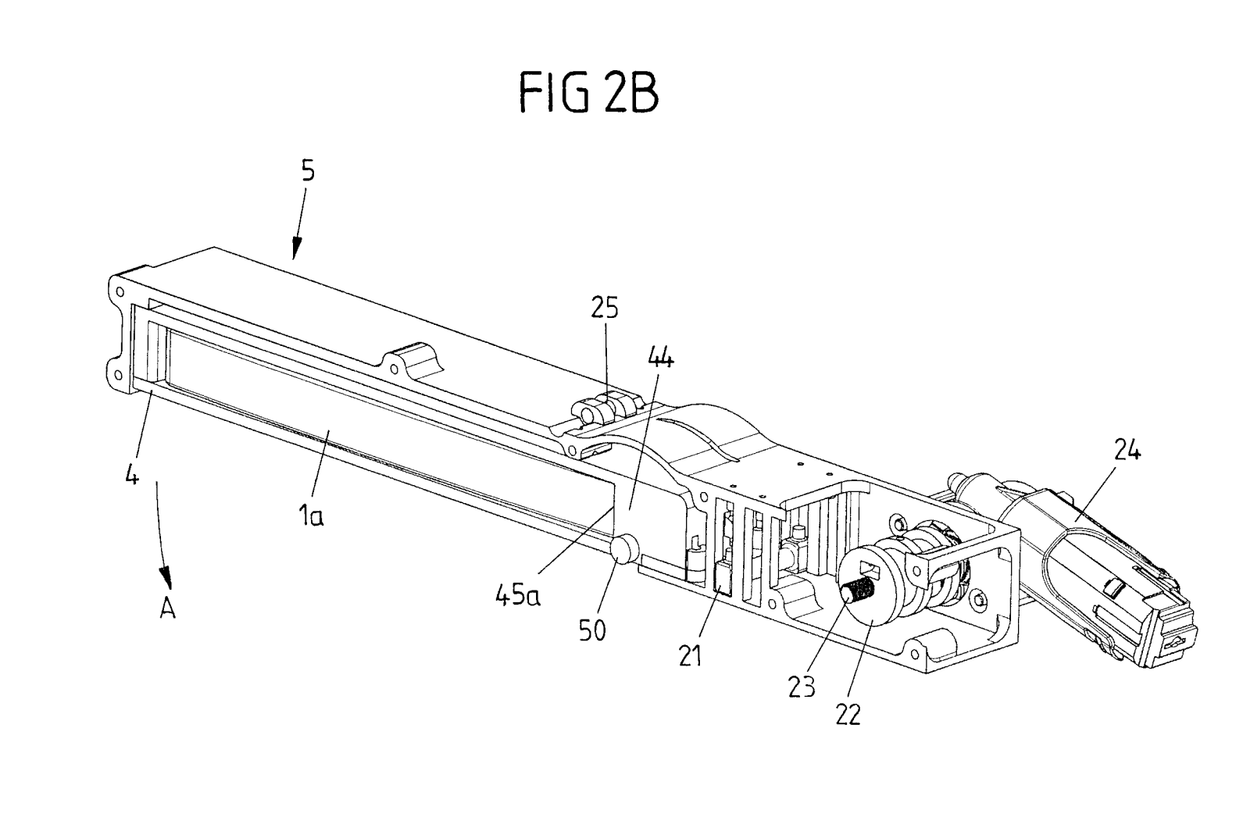

The clothes hanger assembly is adjustable between a functional position, which is shown in FIG. 2A, and a stowage position, which is shown in FIG. 2B. The arms 1a, 1b are folded out in the functional position and folded in in the stowage position.

The carriage 3 is guided on a guide body 4 by two square engagement elements 30a, 30b of the carriage 3 engaging into two guiding grooves 40a, 40b of the guide body 4. The guiding grooves 40a, 40b extend along the longitudinal axis of the cuboid guide body 4 on opposite walls which border a first cavity 41 of the guide body 4.

The first cavity 41 furthermore is delimited by a first stop element 43a of the guide body 4 and by a second stop element 43b at an end of the guide body 4 opposite the first stop element 43a. In the functional position, the carriage 3 rests on the first stop element 43a. In the functional position, the arms 1a, 1b likewise rest on the first stop element 43a and protrude at an angle to the guide body 4 on opposite sides so that they form a hanger-like construction.

The first cavity 41 is molded to support the arms 1a, 1b. In the stowage position, the arms 1a, 1b folded in are mounted in the first cavity 41, and the carriage 3 rests on the second stop element 43b of the guide body 4.

Figure 3A:
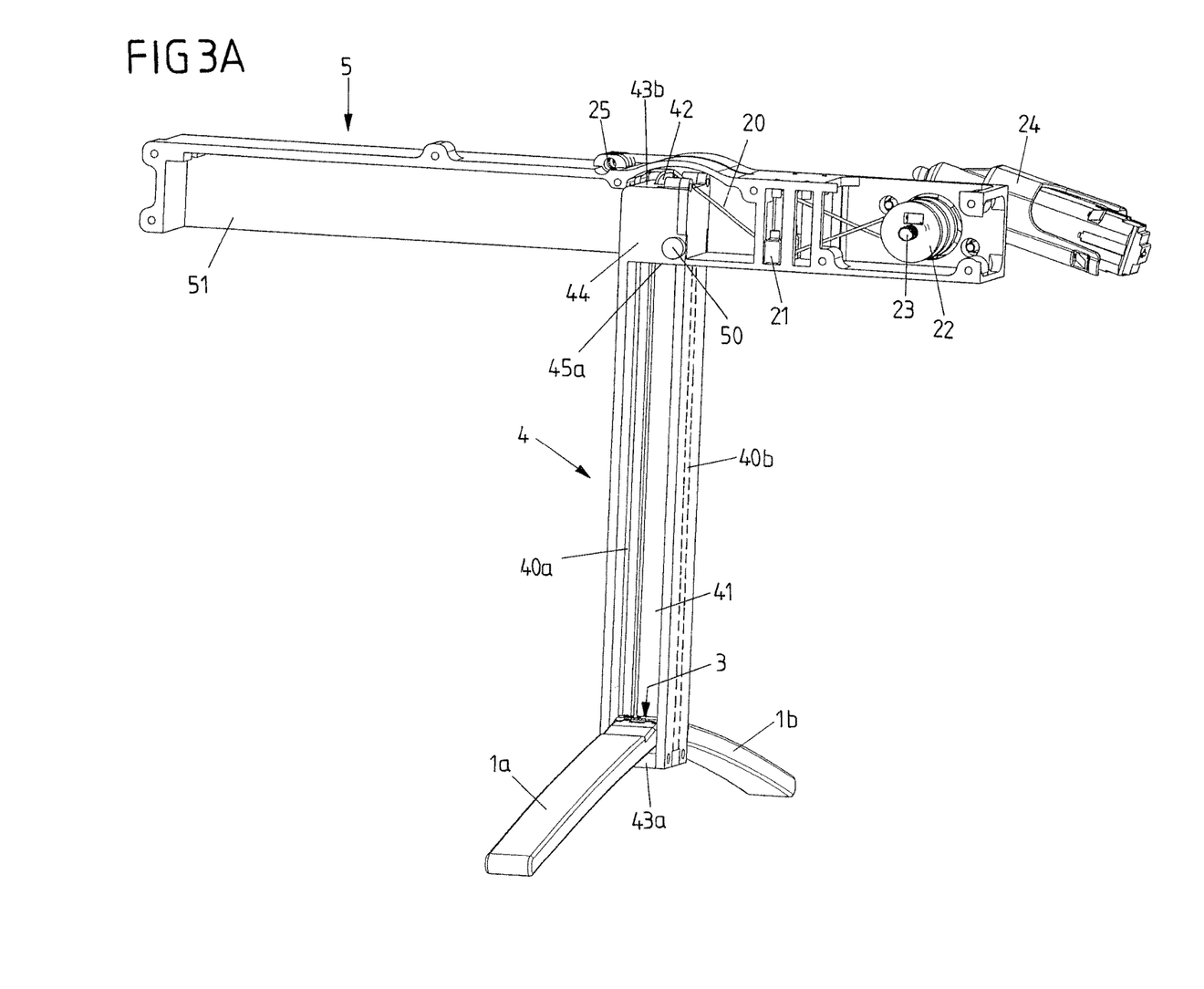
FIGS. 3A, 3B show views of a clothes hanger assembly in the functional position, wherein in the first view a part of a housing of the clothes hanger assembly is transparent.
Figure 3B:
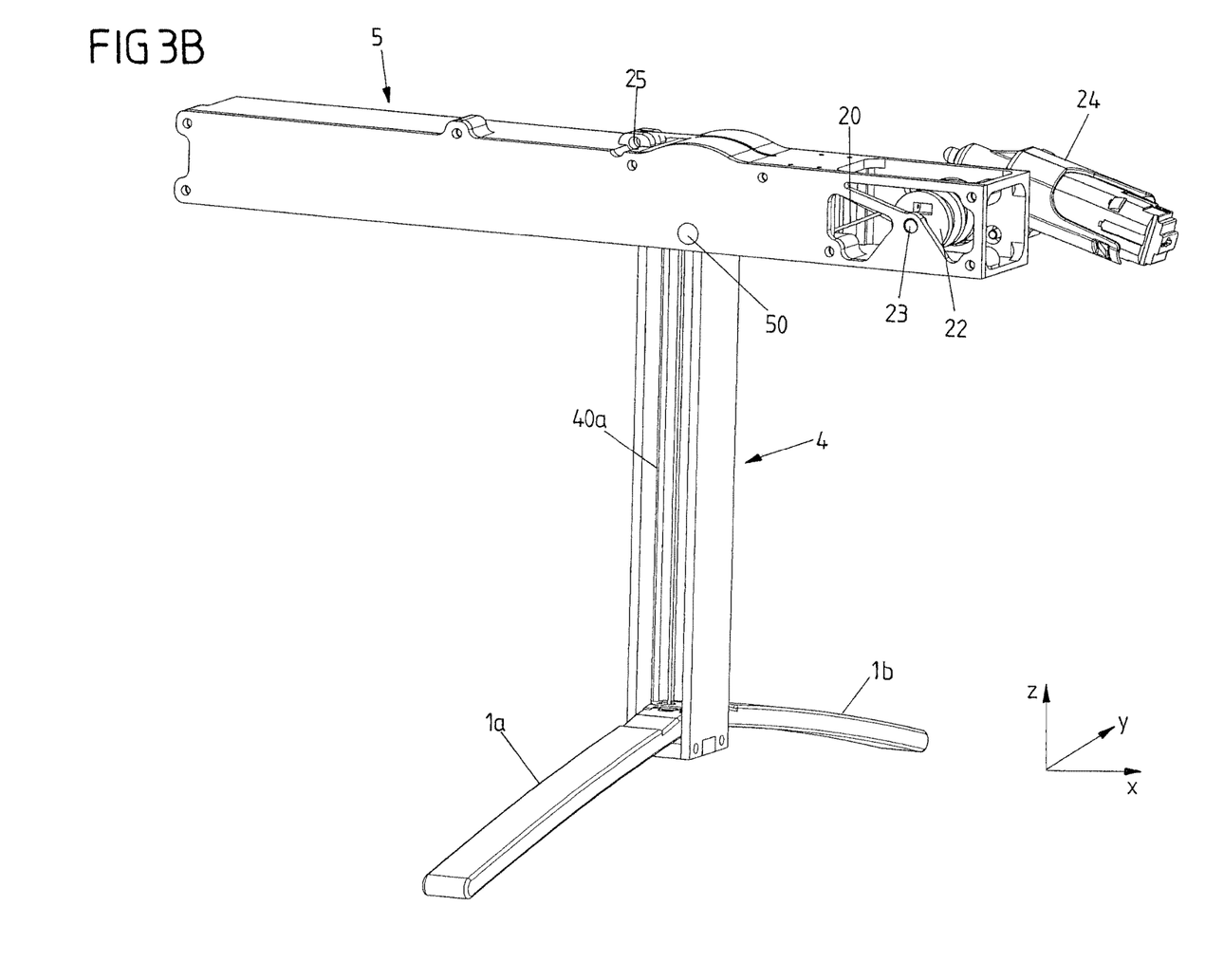

The guide body 4 is articulated to a housing 5 at an articulation point 50, as it is shown in FIG. 3A and FIG. 3B. The articulation point 50 is formed by a hinge about which the guide body 4 may be folded. In the functional position, the guide body 4 is folded out and arranged at right angles to the housing 5, wherein a portion of the guide body 4 extends from the articulation point 50 into a second cavity 51 of the housing 5. In the stowage position, the guide body 4 is folded in and arranged in the second cavity 51 of the housing 5.

The guide body 4 may include a swivel element 42 that is arranged on the portion of the guide body 4 which in the functional position extends from the articulation point 50 into the second cavity 51. The guide body 4 is pivotable relative to the housing 5 about the articulation point 50 by a force which acts on the swivel element 42.

The cable drive 2 may include a cable 20. The two ends of the cable extend from the carriage 3 over the swivel element 42 in opposite directions, as may be taken from a synopsis of FIG. 1 and FIG. 3A. The cable drive 2 thereby may exert forces on the swivel element 42 in two directions.

The clothes hanger assembly furthermore may include a deflection point 26 which is arranged on the first stop element 43a of the guide body 4. The cable 20 is deflected by 180° at the deflection point 26 so that it extends from the carriage 3 to the deflection point 26 and back to the carriage 3.

When the clothes hanger assembly switches from the functional position into the stowage position, the guide body 4 may be folded in about the articulation point 50 in the direction of the housing 5 by pulling the cable 20 via the swivel element 42. In the stowage position of the clothes hanger assembly, the guide body 4 may be folded out from the second cavity 51 about the articulation point 50 by pulling the cable 20 via the swivel element 42.

The cable drive 2 may include a winding element 22, onto which both ends of the cable 20 may be wound. One end of the cable 20 is partly wound up on the winding element 22 in a first direction of rotation, and the other end is partly wound up in a second direction of rotation. Upon rotation of the winding element 22, either the one end of the cable 20 is wound up and the other end of the cable 20 is unwound or, vice versa, the one end of the cable 20 is unwound and the other end of the cable 20 is wound up, depending on the direction of rotation.

The winding element 22 is non-rotatably connected to a shaft 23 of the cable drive 2, which is rotatably mounted on the housing 5. The cable drive 2 may include a motor 24 which is arranged on the housing 5 and which rotates the shaft 23.

The cable drive 2 also may include a tensioning device 21, over which a first end of the cable 20 extends from the winding element 22 to the swivel element 42 and which tensions the cable 20. Winding up from the first end of the cable 20 onto the winding element 22 effects a transition from the functional position into the stowage position.

The cable drive 2 may include a deflection element 25, at which the cable 2 is deflected. A second end of the cable 20 extends from the winding element 22 over the deflection element 25 to the swivel element 42. Winding up from the second end of the cable 20 effects a transition from the stowage position into the functional position.

In detail, switching from the stowage position into the functional position proceeds as follows: When the winding element 22 rotates, the second end of the cable 20, which extends over the deflection element 25, is wound up, and via the swivel element 42 a force acts on the portion of the guide body 4, which in the functional position extends from the articulation point 50 into the second cavity 51, by pulling the cable 20, which force effects folding of the guide body 4 out of the second cavity 51 in a fold-out direction A.

After the guide body 4 is folded out of the second cavity 51, a further winding up of the second end of the cable 20 effects a displacement of the carriage 3 from a position resting on the second stop element 43b in the direction of the first stop element 43a.

In the stowage position, the arms 1a, 1b are sectionally enclosed in a sleeve-shaped stowage element 44 of the guide body 4, which compensates the spring force of the leg springs 32a, 32b. The displacement of the carriage 3 from a position resting on the second stop element 43b in the direction of the first stop element 43a effects that the arms 1a, 1b and the stowage element 44 are brought out of engagement. The spring force of the leg springs 32a, 32b effects that the arms 1a, 1b fold out of the first cavity 41.

Further winding up of the second end of the cable 20 effects a displacement of the carriage 3 along the guide body 4 to the first stop element 43a into the functional position.

Figure 4:
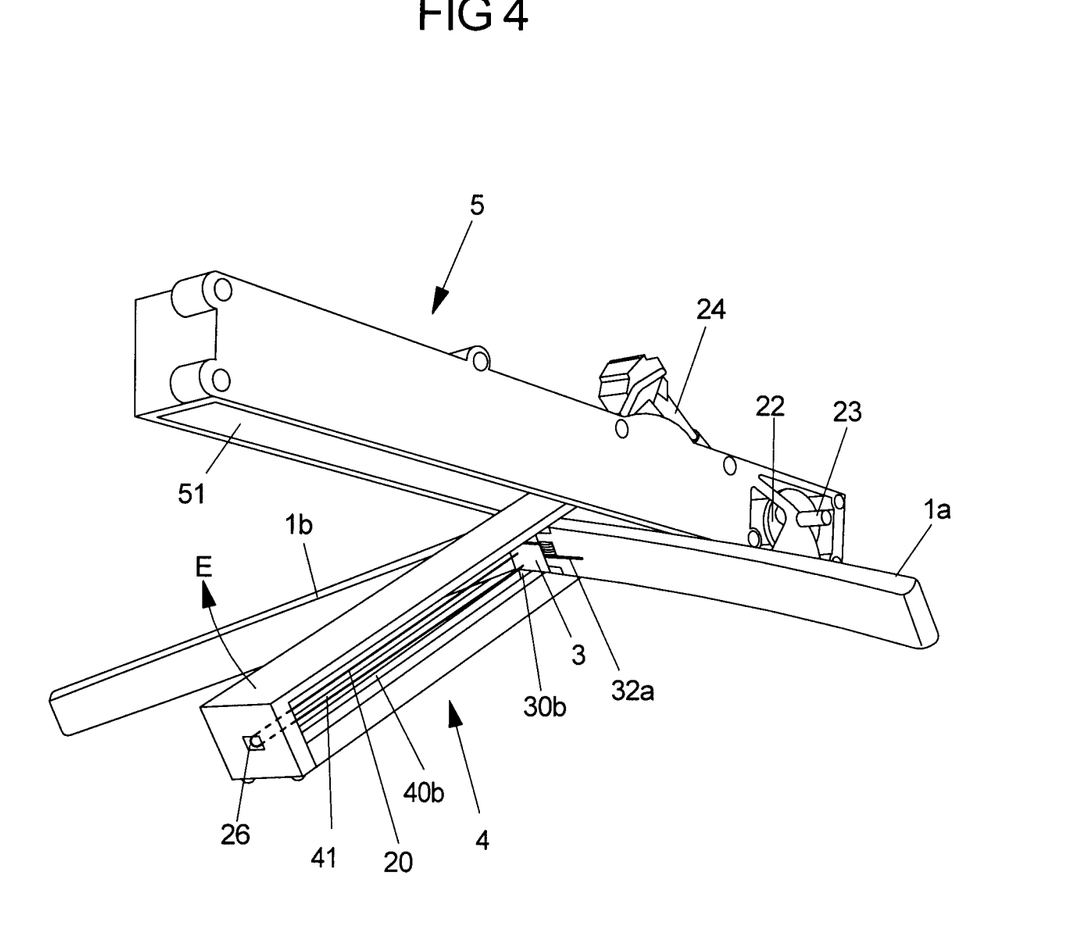
FIG. 4 shows a view of a clothes hanger assembly when switching from the functional position into the stowage position.

Winding up of the first end of the cable 20, which extends over the tensioning device 21, effects a change from the guide position into the stowage position, as is shown in FIG. 4. Initially, winding up leads to a displacement of the carriage 3 in the direction of the second stop element 43b. Upon abutment of the arms 1a, 1b against the first adjustment element 45a and the second adjustment element 45b the arms 1a, 1b fold into the first cavity 41. At the same time, and as an example upon abutment of the carriage 3 against the second stop element 43b, the Bowden cable 2 effects a force acting on the guide body 4 at the swivel element 42, which swivels the guide body 4 about the articulation point 50 in a fold-in direction E. The force acting on the guide body 4 effects folding of the guide body 4 into the second cavity 51 of the housing 5.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS

1a, 1b arm
2 cable drive
20 cable
21 tensioning device
22 winding element
23 shaft
24 motor
25 deflection element
26 deflection point
3 carriage
30a, 30b engagement element
32a, 32b leg spring
33 fastening point
4 guide body
40a, 40b guiding groove
41 first cavity
42 swivel element
43a first stop element
43b second stop element
44 stowage element
45a first adjustment element
45b second adjustment element
5 housing
50 articulation point
51 second cavity
A fold-out direction
E fold-in direction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A clothes hanger assembly for installation in a vehicle interior space, the clothes hanger assembly comprising:
   two arms adjustable between a stowage position, in which the arms are stowed, and a functional position, in which the arms form a hanger-like construction;
   a cable drive; and
   a carriage arranged on the cable drive, the cable drive configured to actuate to translate the carriage between a first position and a second position to articulate the two arms about the carriage between the stowage position and the functional position.

2. The clothes hanger assembly of claim 1, further comprising: a guide body that guides the carriage.

3. The clothes hanger assembly of claim 2, wherein the guide body defines a guiding groove and the carriage includes an engagement element that engages the guiding groove.

4. The clothes hanger assembly of claim 2, wherein the guide body defines a first cavity and when the two arms are in the stowage position, the arms are stowed in the first cavity.

5. The clothes hanger assembly of claim 4, further comprising: a housing defining an articulation point, wherein the guide body is configured to articulate at the articulation point.

6. The clothes hanger assembly of claim 5, further comprising: a swivel element arranged on the guide body and spaced apart from the articulation point such that a force is exerted on the guide body by means of the cable drive via the swivel element, articulating the guide body relative to the housing about the articulation point.

7. The clothes hanger assembly of claim 5, wherein the housing defines a second cavity and the guide body is configured to move between a guide-body stowage position and a guide-body functional position, wherein when the guide body is in the guide-body stowage position, the guide body is stowed in the second cavity and when the guide body is in the guide-body functional position, the guide body is arranged along an angle with respect to the housing.

8. The clothes hanger assembly of claim 5, wherein the cable drive includes a winding element rotatably mounted in the housing.

9. The clothes hanger assembly of claim 5, wherein the clothes hanger assembly is a prefabricated module configured to be installed in the vehicle interior space and including a housing, a guide body configured to be articulated thereto, and a motor operable to drive the cable drive.

10. The clothes hanger assembly of claim 1, wherein the cable drive includes a cable, wherein the carriage is attached to the cable.

11. The clothes hanger assembly of claim 10, wherein the cable drive includes a tensioning device configured to tension the cable.

12. The clothes hanger assembly of claim 10, wherein the cable drive includes a winding element configured to wind the cable.

13. The clothes hanger assembly of claim 12, wherein the cable drive includes a rotatable shaft and a motor configured to drive the shaft, wherein the winding element is non-rotatably mounted on the shaft.

14. The clothes hanger assembly of claim 1, further comprising: a leg spring configured to pretension at least one of the arms against the carriage.

15. The clothes hanger assembly of claim 1, further comprising: a first adjustment element by means of which the arms are pivotable relative to the carriage by abutment upon adjustment from the functional position to the stowage position.

16. A clothes hanger assembly for use in a vehicle, the clothes hanger assembly comprising:
   a carriage;
   an arm attached to and configured to pivot about the carriage between a stowage position and a functional position, wherein the arm forms a hanger when in the functional position; and
   a cable drive including a cable and a winding element configured to wind and unwind the cable to pivot the arm between the stowage position and the functional position.

17. The clothes hanger assembly of claim 16, further comprising:
   a guide body defining a guide channel, wherein the carriage is configured to translate along the guide channel as the arm moves between the stowage position and the functional position.

18. A clothes hanger assembly for use in a vehicle, the clothes hanger assembly comprising:
   a carriage;
   an arm attached to and configured to pivot about the carriage between a stowage position and a functional position configured to form a hanger;
   a cable drive including a cable and a winding element; and
   a motor operable to rotate the cable drive to wind and unwind the cable to pivot the arm between the stowage position and the functional position.

19. The clothes hanger assembly of claim 18, further comprising:
   a guide body defining a guide groove that receives the arm when the arm is in the stowage position.

20. The clothes hanger of claim 19, further comprising:
   a housing defining a cavity, wherein the guide body is configured to pivot with respect to the housing between a first position and a second position, wherein when the guide body is in the first position, the guide body is disposed in the cavity.

* * * * *